United States Patent

Walker et al.

[15] 3,706,181

[45] Dec. 19, 1972

[54] PROCESS FOR THE SAFE HANDLING OF $C_3$ AND $C_4$ ACETYLENIC HYDROCARBONS

[72] Inventors: David G. Walker, Baytown; Donald A. Keyworth, Houston, both of Tex.

[73] Assignee: Tenneco Chemicals, Inc.

[22] Filed: Nov. 20, 1970

[21] Appl. No.: 91,567

[52] U.S. Cl..........................55/63, 55/74, 260/260 A
[51] Int. Cl. ..............................................B01d 53/02
[58] Field of Search........55/59, 63, 74, 387, 79, 179; 260/677 AD, 679 A, 681.5; 208/99, 310; 252/444, 445

[56] References Cited

UNITED STATES PATENTS

| | | | |
|---|---|---|---|
| 2,554,908 | 5/1951 | Hirschler | 260/677 |
| 3,243,470 | 3/1966 | Davis et al. | 260/677 AD |
| 3,201,491 | 8/1965 | Stine et al. | 260/677 AD |
| 2,571,936 | 10/1951 | Patterson et al. | 260/677 AD |
| 2,663,626 | 12/1953 | Spangler | 55/74 |

*Primary Examiner*—Charles N. Hart
*Attorney*—Daniel J. Reardon, Barry G. Magidoff and Evelyn Berlow

[57] ABSTRACT

An improved safe method for the handling, concentration, purification, storage, and transportation of $C_3$ and $C_4$ acetylenic hydrocarbons involves contacting a gas stream that contains 10 mole percent or less of these compounds with activated carbon to form compositions that comprise activated carbon on whose surface about 2 percent to 10 percent, based on the weight of the carbon, of $C_3$ and/or $C_4$ acetylenic compounds have been adsorbed. These activated carbon compositions, which are air stable and which cannot be detonated, can be handled, stored and transported without appreciable danger of explosion. Concentrated and purified acetylenic compounds can be recovered by stripping the carbon with, for example, a nitrogen-methylene chloride mixture. Further improvement in the safety of the method results when the pyrolysis gas is diluted with an inert, non-explosive gas that has carbon adsorption characteristics similar to those of the $C_4$ acetylenic compounds prior to the treatment of the activated carbon with the pyrolysis gas stream.

18 Claims, No Drawings

PROCESS FOR THE SAFE HANDLING OF C3 AND C4 ACETYLENIC HYDROCARBONS

This invention relates to a method for the safe handling of acetylenic compounds that have three or four carbon atoms. More particularly, it relates to a safe method of concentrating, isolating, transporting, storing, and using methylacetylene, diacetylene, vinylacetylene, and mixtures of these compounds.

The high temperature pyrolysis of hydrocarbons yields acetylene, hydrogen, carbon dioxide, carbon monoxide, and small amounts of other unsaturated hydrocarbons that contain from two to 10 or more carbon atoms. The unsaturated hydrocarbons that have three or four carbon atoms, that is, methylacetylene, allene, diacetylene, and vinylacetylene, are generally present in the pyrolysis gas streams in the amount of about 5 percent to 10 percent, based on the weight of acetylene in the gas stream. After removal of the acetylene from them, the gas streams contain about 1 percent to 10 percent by weight of the $C_3$ and $C_4$ acetylenic compounds.

While the $C_3$ and $C_4$ acetylenic compounds are potentially valuable as reactants in the manufacture of a number of chemical products, they have not been used to any appreciable extent in these applications because of the difficulties and hazards involved in isolating them from the gas streams. The concentration of these compounds in the gas streams and their separation by fractional distillation procedures are dangerous to carry out because diacetylene is extremely sensitive and can decompose explosively in the gas phase at temperatures above −20°C. Its critical pressure for explosion is only 0.041 atmosphere absolute. It has been reported that this critical pressure can be raised to about 1 atmosphere absolute by diluting the diacetylene with a sizeable amount of a non-explosive inert gas, such as ammonia, carbon dioxide, sulfur dioxide, nitrogen, propane, butane, butylene, and the like. The resulting gas streams that contain less than about 10 percent by weight of the acetylenic compounds do not deflagrate even at extremely high total gas pressures and temperatures. Attempts to use the acetylenic compounds in these dilute gas streams as reactants have been unsuccessful because of problems involving catalysts and other reactants caused by the inadequate residence times of the acetylenic compounds in the reaction vessel. For their use as reactant to be practical, the $C_3$ and $C_4$ acetylenic compounds should be made available with as little diluent gas as is consistent with safety.

In accordance with this invention, a safe and efficient method has been developed for the separation of $C_3$ and $C_4$ acetylenic compounds from gas streams that contain less than about 10 percent by weight of these compounds. The acetylenic compounds are obtained in a concentrated form that can be safely and easily handled, stored, and transported and from which the acetylenic compounds can be recovered quantitatively and in substantially pure form. In the method of this invention $C_3$ and $C_4$ acetylenic compounds are safely and efficiently removed from gas streams that contain 10 percent or less of these compounds by contacting the gas streams with activated carbon. The carbon adsorbs the $C_3$ and $C_4$ acetylenic compounds quantitatively until its surface is saturated. The adsorbed acetylenic compounds do not polymerize to any noticeable degree on prolonged storage at ambient temperature.

The gas-saturated carbons, which contain about 2 percent to 10 percent by weight of adsorbed $C_3$ and $C_4$ acetylenic compounds and in most cases 5 percent to 8 percent by weight of these compounds, are air stable and cannot be detonated. They are readily flammable and burn rapidly with a very sooty flame. The gas-saturated carbon compositions can be safely and conveniently handled, stored, and transported. The acetylenic compounds can be readily recovered from them by passing a stream of inert gas, through the bed of gas-saturated carbon until all of the acetylenic compound has been desorbed. The resulting gas stream, which contains about 30 to 50 mole percent of $C_3$ and $C_4$ acetylenic compounds in an inert gas, can be used as a source of the acetylenic compounds in various reactions. Illustrative of the inert gases that can be used to displace the adsorbed acetylenic compounds are steam and nitrogen-methylene chloride mixtures. The preferred inert gas is a mixture comprising 50 to 75 mole percent of nitrogen and 25 to 50 mole percent of methylene chloride. Particularly satisfactory results have been obtained using nitrogen saturated with methylene chloride at ambient temperature.

While the aforementioned method provides a generally safe and efficient means of handling, storing, transporting, concentrating, and isolating the $C_3$ and $C_4$ acetylenic compounds, occasionally the conditions under which the acetylenic compounds are being desorbed from the carbon are such that there is local overheating and a mild deflagration of the gas mixture occurs. In a preferred embodiment of this invention, the aforementioned method is modified to eliminate the possibility that the acetylenic compounds in the gas stream will deflagrate during handling or storage. In this modified process, a stable, non-explosive compound that has approximately the same affinity for carbon as the $C_4$ acetylenic compounds is added to the gas stream before it is brought into contact with the activated carbon. The gas stream is diluted to such an extent that it will not propagate a deflagration even with vigorous initiation, for example, using a white hot platinum wire as a detonator. The pyrolysis gas stream is ordinarily mixed with about 30 percent to 70 percent of its weight, and preferably about 45 percent to 60 percent of its weight, of said diluent.

The diluents that are used in this process are stable, non-explosive compounds that are non-reactive toward the acetylenic compounds and that have an affinity for carbon adsorption that is similar to that of diacetylene and vinylacetylene. They preferably have distribution numbers of about 0.4 to 3.0 for diacetylene and vinylacetylene. The distribution numbers are obtained by measuring the distribution of the compounds between activated carbon and the gas phase and using the following equation:

$$\alpha \text{ (for } C_4H_2) = \frac{[C_4H_2 \text{ on carbon}] [\text{inert compound in gas phase}]}{[C_4H_2 \text{ in gas phase}] [\text{inert compound on carbon}]}$$

Illustrative of the stable, non-explosive diluents that can be used in the practice of this invention are the following:

|  | α for Diacetylene | α for Vinylacetylene |
|---|---|---|
| Isopentane | 0.59 | 0.48 |
| Ethyl chloride | 1.45 | 1.59 |
| n-Butane | 2.0 | 1.85 |
| 2,2-Dimethylpropane | 2.94 | 2.95 |

Particularly satisfactory results have been obtained using a gas stream that contained substantially equimolar amounts of $C_4$ acetylenic compounds and n-butane. When this gas stream is brought into contact with activated carbon, about 2 percent to 5 percent, based on the weight of the carbon, of the acetylenic compounds and about 2 percent to about 5 percent, based on the weight of the carbon, of n-butane are adsorbed on the surface of the activated carbon. The resulting gas-saturated carbon can be handled, stored, and transported without danger of deflagration. When this carbon is treated with a stream of an inert gas, such as steam or a mixture of nitrogen and methylene chloride, there is obtained a gas stream that comprises 20 to 50 mole percent of the acetylenic compounds and 20 to 50 mole percent of n-butane. This gas stream can be safely added to reaction vessels in which the acetylenic compounds are to be used as reactants. For example, it can be added to a dilute solution of a halogen compound to form polyhalogenated hydrocarbons. This process is described in detail in our copending application Ser. No. 91,566, which was filed on Nov. 20, 1970.

The gas streams that comprise $C_3$ and $C_4$ acetylenic compounds and n-butane or another inert, non-explosive gas having a distribution number as hereinbefore defined in the range of about 0.4 to 3.0 can be used as such in halogenation or other reactions. Alternatively, the process can be modified to separate the $C_3$ compounds from the $C_4$ compounds or to yield substantially pure diacetylene. In each case the product is a mixture of the acetylenic compound or compounds with an amount of n-butane or another inert non-explosive compound that overcomes the tendency of the acetylenic compounds to deflagrate.

In the practice of this invention a gas stream that contains about 1 mole percent to 10 mole percent of acetylenic compounds having 3 or 4 carbon atoms is brought into contact with activated carbon until the surface of the carbon is saturated with these acetylenic compounds. The conditions under which this process is carried out are not critical. It is generally most convenient to carry it out at atmospheric pressure and at ambient temperature. If desired, other temperatures and pressures can be used. The process is ordinarily carried out by passing the gas stream through standard carbon-packed columns. A plurality of columns is used so that the carbon in one column can be stored, transported, stripped, or otherwise used while another column is on stream.

The activated carbons that can be used in the process of this invention are prepared by heating a carbonaceous material of vegetable, animal, or mineral origin at temperatures above 400° C. until the material is completely carbonized. Among the materials from which the activated carbons may be prepared are coal, coconut shells, wood dust, peat, petroleum residues, and the like. The carbon should have an initial adsorption capacity for carbon tetrachloride at ambient temperatures of at least 8 percent, since those of lower capacity are deactivated too rapidly to be economically practical. High surface area carbons that have an initial adsorption capacity for carbon tetrachloride of 50 percent or more are not ordinarily used in the practice of this invention because they add to the cost of the process without providing a corresponding improvement in its efficiency. The activated carbon is usually employed as a finely-divided powder having a particle size of about 10 to 200 mesh. Particularly good results have been obtained using activated carbon prepared by heating coal in steam at 700°–900° C. One such material, which is marketed as Pittsburgh Type SGL, has the following characteristics:

| | |
|---|---|
| Particle Size | 8 × 30 (U.S. Sieve Series) |
| Density | 0.48 g./ml. |
| Total Pore Volume | 0.85 ml./gram |
| Pore Volume Distribution (%) | |
| >25 A. | 67 |
| 15–25 A. | 15 |
| <15 A. | 18 |

The quantity of activated carbon that is used is not critical and depends to a large degree on the amount of $C_3$ and $C_4$ acetylenic compounds that are present in the gas stream.

The $C_3$ and $C_4$ acetylenic compounds that are adsorbed on the surface of the carbon can be desorbed by passing through the carbon a stream of inert gas, such as steam or mixtures of nitrogen and methylene chloride. This step is ordinarily and preferably carried out at atmospheric pressure and ambient temperature, but other temperatures and pressures can be used.

In addition to separating $C_3$ and $C_4$ acetylenic compounds from a gas stream, the process of this invention can be used to separate the $C_3$ compounds from the $C_4$ compounds to yield substantially pure diacetylene. In these embodiments of the invention, a gas stream that contains 1 to 10 mole percent of $C_3$ and $C_4$ acetylenic compounds is passed into a first bed of activated carbon, and the gas leaving the first bed is passed into a second bed of activated carbon until the surface of the carbon in the first bed is saturated with $C_4$ acetylenic compounds (diacetylene and vinylacetylene) and the surface of the carbon in the second bed is saturated with $C_3$ compounds (methylacetylene and allene). Treatment of the first bed of saturated carbon with a stream of nitrogen saturated with methylene chloride at ambient temperature results in the formation of a gas stream that contains about 20 to 50 mole percent of the $C_4$ acetylenic compounds in nitrogen. When this gas stream is passed through a sulfuric acid scrubber, the vinylacetylene is removed from it, and there is obtained a gas stream that contains about 20 to 30 mole percent of diacetylene and 70 to 80 mole percent of nitrogen. Passage of this gas stream through a liquid nitrogen trap yields substantially pure diacetylene. Treatment of the second bed of saturated carbon with a stream of nitrogen saturated with methylene chloride at ambient temperature results in the formation of a gas stream that contains about 20 to 50 mole percent of methylacetylene and allene in nitrogen.

The invention is further illustrated by the examples that follow.

EXAMPLE 1

A. A gas mixture obtained by the pyrolysis of natural gas had the following composition:

Moles per Million Moles of Gas

| | |
|---|---|
| Hydrogen | 550,000 |
| Carbon Monoxide | 270,000 |
| Acetylene | 75,000 |
| Methane | 65,000 |
| Carbon Dioxide | 35,000 |
| Ethylene | 4,000 |
| Diacetylene | 1,700 |
| Methylacetylene + allene | 1,200 |
| Vinylacetylene | 800 |
| Aromatic Hydrocarbons | 600 |
| $C_6$ Acetylenic Compounds | 40 |
| $C_8$ Acetylenic Compounds | 30 |

After the removal of most of the acetylene from it, the gas stream contained 3.7 mole percent of diacetylene, 1.7 mole percent of methylacetylene and allene, 1.3 mole percent of vinylacetylene, and small amounts of acetylene and butadiene. This gas stream was passed at ambient temperature and atmospheric pressure through a two-foot bed that contained 400 grams of activated carbon (Pittsburgh Type SGL) until the carbon was saturated. A total of 34 grams (8.2 percent by weight) of the following mixture of compounds was adsorbed on the carbon:

| | Mole Percent | Weight Percent |
|---|---|---|
| Diacetylen | 58.5 | 58.7 |
| Vinylacetylene | 34.0 | 35.0 |
| Methylacetylene + allene | 3.3 | 2.8 |
| Acetylene | 2.8 | 1.5 |
| Butadiene | 1.4 | 2.0 |

The saturated carbon was stripped by passing through the bed a stream of nitrogen that was saturated with methylene chloride at room temperature. The resulting gas stream contained about 30 to 50 mole percent of diacetylene and vinylacetylene and 50 to 70 mole percent of nitrogen.

B. The gas stream that contained diacetylene, vinylacetylene, and nitrogen was passed through a sulfuric acid scrubber which removed the vinylacetylene from it. There was obtained a gas stream that contained about 25 mole percent of diacetylene and 75 mole percent of nitrogen. Passage of this gas stream through a liquid nitrogen trap yielded substantially pure (>96 percent) diacetylene.

EXAMPLE 2

A gas stream that contained 3.7 mole percent of diacetylene, 1.7 mole percent of methylacetylene and allene, 1.3 mole percent of vinylacetylene, and smaller amounts of acetylene and butadiene and that was obtained by the removal of most of the acetylene from a hydrocarbon pyrolysis gas stream was passed at 0.8 atmosphere pressure and ambient temperature through a primary carbon bed that contained 400 grams of activated carbon (Pittsburgh Type SGL). The gases leaving this bed were passed through a secondary carbon bed that contained 400 grams of activated carbon (Pittsburgh Type SGL).

At the start of the treatment, the $C_3$ and $C_4$ acetylenic compounds were adsorbed quantitatively by the activated carbon in the primary carbon bed. As the passage of the gas stream through the carbon beds was continued, the $C_4$ acetylenic compounds were retained on the primary carbon bed, while the $C_3$ acetylenic compounds were desorbed by the primary carbon bed and then adsorbed by the secondary carbon bed.

The carbon bed on which the $C_3$ acetylenic compounds had been adsorbed and that on which the $C_4$ acetylenic compounds had been adsorbed were stored for 5 days during which time the adsorbed acetylenic compounds did not polymerize to any noticeable extent. The saturated carbons, which contained 5–8 percent by weight of the acetylenic compounds, could not be detonated by vigorous pounding with a hammer and anvil. The saturated carbons were air stable. They could be ignited easily by a spark or open flame, and they burned rapidly with a very sooty flame.

The acetylenic compounds were recovered from the saturated carbons by passing through the carbon beds a stream of nitrogen saturated with methylene chloride at ambient temperature. There were obtained a gas stream that contained about 30 to 50 mole percent of methylacetylene and allene and 50 to 70 mole percent of nitrogen and a gas stream that contained about 30 to 50 mole percent of diacetylene and vinylacetylene and 50 to 70 mole percent of nitrogen.

EXAMPLE 3

A gas stream that contained 3.7 mole percent of diacetylene, 1.3 mole percent of vinylacetylene, 1.7 mole percent of methylacetylene and allene, and 5.0 mole percent of n-butane was passed at atmospheric pressure and ambient temperature through a primary carbon bed that contained 400 grams of activated carbon. The gases leaving this bed were passed through a secondary bed that contained 400 grams of activated carbon. The gas stream was passed through the carbon beds until the carbon in the primary bed was saturated with $C_4$ compounds and the carbon in the second bed was saturated with $C_3$ compounds.

The carbon in the primary bed was subjected to a rapid steam purge at atmospheric pressure until all of the $C_4$ compounds had been removed from it. No deflagration occurred during the steaming. Analysis of the recovered gas indicated that it contained about 34 mole percent of diacetylene, 20 mole percent of vinylacetylene, and 46 mole percent of n-butane.

EXAMPLE 4

The procedure described in Example 3 was repeated using each of the following inert non-explosive compounds in place of the n-butane:

a. Propane
b. Isobutane
c. Isopentane
d. Pentane
e. Butylene
f. Pentylene
g. 2,2-Dimethylpropane
h. Ethyl chloride
i. Methyl bromide In each case the gas mixture contained 40 to 60 mole percent of the $C_4$ acetylenic compounds based on the total amount of $C_4$ acetylenic compounds and inert non-explosive compound. The gas mixtures were passed through beds of activated carbon. The carbon beds were then treated with steam to generate gas streams that contained 30 to 50 mole percent of the $C_4$ acetylenic compounds and 50 to 70 mole percent of the inert non-explosive compounds.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. The process for the separation of acetylenic compounds having 3 or 4 carbon atoms from a hydrocarbon pyrolysis gas that contains from 1 mole percent to 10 mole percent of said acetylenic compounds that comprises the steps of
   a. passing said hydrocarbon pyrolysis gas through a bed of activated carbon until the surface of the carbon is saturated with adsorbed acetylenic compounds having three or four carbon atoms and
   b. passing a stream of inert gas through the bed of saturated activated carbon thereby desorbing the acetylenic compounds and forming a gas stream that contains about 30 to 50 mole percent of acetylenic compounds having three or four carbon atoms in said inert gas.

2. The process of claim 1 wherein in Step (a) the hydrocarbon pyrolysis gas is passed into a first bed of activated carbon and the gas leaving said first bed is passed into a second bed of activated carbon until the surface of the carbon in the first bed is saturated with diacetylene and vinylacetylene and the surface of the carbon in the second bed is saturated with methylacetylene and allene and in Step (b) streams of inert gas are passed through the beds of saturated activated carbon thereby desorbing the acetylenic compounds and forming a gas stream that contains 30 to 50 mole percent of diacetylene and vinylacetylene in said inert gas and a gas stream that contains 30 to 50 mole percent of methylacetylene and allene in said inert gas.

3. The process for the separation of acetylenic compounds having three or four carbon atoms from a hydrocarbon pyrolysis gas that contains from 1 mole percent to 10 mole percent of said acetylenic compounds that comprises the following steps:
   a. passing said hydrocarbon pyrolysis gas through a bed of activated carbon until the surface of the carbon is saturated with adsorbed acetylenic compounds having three or four carbon atoms and
   b. passing a stream of inert gas that is a mixture comprising 50 to 75 mole percent of nitrogen and 25 to 50 mole percent of methylene chloride through a bed of saturated activated carbon thereby desorbing the acetylenic compounds and forming a gas stream that contains about 30 to 50 mole percent of acetylenic compounds having three or four carbon atoms in nitrogen.

4. The process for the separation of acetylenic compounds having three or four carbon atoms from a hydrocarbon pyrolysis gas that contains from 1 mole percent to 10 mole percent of said acetylenic compounds that comprises the following steps:
   a. mixing the hydrocarbon pyrolysis gas with about 30 percent to 70 percent of its weight of an inert, non-explosive gas that has carbon adsorption characteristics similar to those of diacetylene and vinylacetylene,
   b. passing the resulting gas mixture through a bed of activated carbon until the surface of the carbon is saturated with adsorbed acetylenic compounds having three or four carbon atoms and said inert, non-explosive gas, and
   c. passing a stream of inert gas through the bed of saturated activated carbon thereby desorbing the acetylenic compounds and said inert, non-explosive gas and forming a gas stream that contains about 30 to 50 mole percent of acetylenic compounds and said inert, non-explosive gas in said inert gas.

5. The method of claim 4 wherein the hydrocarbon pyrolysis gas is mixed with about 45 percent to 60 percent of its weight of said inert, non-explosive gas.

6. The method of claim 4 wherein the inert, non-explosive gas with which the pyrolysis gas is mixed is n-butane.

7. The process for the separation of acetylenic compounds having three or four carbon atoms from a hydrocarbon pyrolysis gas stream that contains from 1 mole percent to 10 mole percent of said acetylenic compounds that comprises the steps of
   a. passing the hydrocarbon pyrolysis gas into a first bed of activated carbon and the gas leaving said first bed into a second bed of activated carbon until the surface of the carbon in the first bed is saturated with diacetylene and vinylacetylene and the surface of the carbon in the second bed is saturated with methylacetylene and allene and
   b. passing into each of said beds of gas-saturated carbon a stream of inert gas that is a mixture comprising 50 to 75 mole percent of nitrogen and 25 to 50 mole percent of methylene chloride thereby desorbing the acetylenic compounds and forming gas streams that contain 20 to 50 mole percent of said acetylenic compounds in nitrogen.

8. The process of claim 7 wherein in Step (b) the stream of nitrogen and methylene chloride is passed through said first bed of saturated activated carbon to form a gas stream that contains about 20 to 50 mole percent of diacetylene and vinylacetylene in nitrogen and said gas stream is passed through a sulfuric acid scrubber to give a gas stream that comprises about 20 to 40 mole percent of diacetylene and about 60 to 80 mole percent of nitrogen.

9. The process of claim 8 wherein the gas stream that comprises diacetylene and nitrogen is passed through a liquid nitrogen trap to condense the nitrogen and yield substantially pure diacetylene.

10. The process of claim 7 wherein the inert gas used to separate the acetylenic compounds from the gas-saturated carbon is nitrogen saturated with methylene chloride at ambient temperature.

11. The process for the separation of acetylenic compounds having three or four carbon atoms from a hydrocarbon pyrolysis gas that contains from 1 mole percent to 10 mole percent of said acetylenic compounds that comprises the steps of
   a. mixing the hydrocarbon pyrolysis gas with about 30 percent to 70 percent of its weight of an inert, non-explosive gas that has an affinity for carbon adsorption that is similar to that of diacetylene and vinylacetylene, b. passing the resulting gas mixture into a first bed of activated carbon and the gas leaving the first bed into a second bed of activated carbon until the surface of the carbon in said first bed is saturated with diacetylene, vinylacetylene, and said inert, non-explosive gas and the surface of the carbon in the second bed is saturated with methylacetylene, allene, and said inert, non-explosive gas and c. passing into each of said beds of gas-saturated carbon a stream of inert gas that is a mixture comprising 50 to 75 mole percent of nitrogen and 25 to 50 mole percent of methylene chloride thereby desorbing the acetylenic compounds and the inert, non-explosive gas from the surface of the carbon and forming gas streams that contain 20 to 50 mole percent of said acetylenic compounds and said inert, non-explosive gas in nitrogen.

12. The process of claim 11 wherein the inert, non-explosive gas is n-butane.

13. The process of claim 11 wherein the gas stream that contains 20 to 50 mole percent of diacetylene, vinylacetylene, and said inert, non-explosive gas in nitrogen is passed through a sulfuric acid scrubber to form a gas stream that contains diacetylene, the non-explosive gas, and nitrogen.

14. A non-explosive composition that comprises activated carbon on whose surface has been adsorbed 2 percent to 5 percent, based on the weight of activated carbon, of an acetylenic component selected from the group consisting of methylacetylene, diacetylene, vinylacetylene, and mixtures thereof and 2 percent to 5 percent, based on the weight of activated carbon, of an inert, non-explosive gas having carbon adsorption characteristics similar to those of diacetylene and vinylacetylene.

15. The composition of claim 14 wherein the acetylenic component comprises diacetylene.

16. The composition of claim 14 wherein the acetylenic component is a mixture of diacetylene and vinylacetylene.

17. The composition of claim 14 wherein the inert, non-explosive gas is n-butane.

18. The composition of claim 14 wherein the inert, non-explosive gas is ethyl chloride.

* * * * *